Sept. 16, 1930.    B. F. FITCH    1,776,066
APPARATUS FOR TRANSFERRING FREIGHT
Filed Nov. 26, 1928    2 Sheets-Sheet 1

Inventor
Benjamin F. Fitch,
By Bates, Goldrick & Teare,
Attorneys

Sept. 16, 1930. B. F. FITCH 1,776,066
APPARATUS FOR TRANSFERRING FREIGHT
Filed Nov. 26, 1928 2 Sheets-Sheet 2

Patented Sept. 16, 1930

1,776,066

UNITED STATES PATENT OFFICE

BENJAMIN F. FITCH, OF GREENWICH, CONNECTICUT, ASSIGNOR TO MOTOR TERMINALS COMPANY, OF WILMINGTON, DELAWARE, A CORPORATION OF DELAWARE

APPARATUS FOR TRANSFERRING FREIGHT

Application filed November 26, 1928. Serial No. 321,833.

This invention relates to a freight handling system wherein demountable bodies are provided which are adapted to be transported by a vehicle to a transfer point and there removed with the contained load from the vehicle, and thereafter another loaded body deposited on the vehicle. As such bodies to be efficient must be of considerable size, some hoisting and transporting mechanism is essential for removing or replacing the loaded body. My invention is more particularly concerned with the transfer of body to and from freight cars of electric interurban lines having overhead trolley wires, and it is an object of the invention to provide hoisting and transporting mechanism of very simple and efficient form so arranged that it may readily move load supporting cables across the space beneath the trolley wire, and which may be installed at comparatively small expense.

My invention contemplates a superstructure located adjacent the side of the railway track and having an overhead trackway on which is a traveling crane. This traveling crane is so constructed that it may project on one side into the space above the car body and beneath the trolley wire and thus allow the body to be engaged and lifted and transported to one side without disturbing the trolley wire.

My crane preferably has four depending cables located at the four corners of a rectangle and when the crane is in position for removing a body from the electric car or depositing one thereon, two of these cables will be beyond the vertical plane beneath the trolley wire. The portion of the crane however on which such cables are mounted is so arranged that it will not interfere in any manner with the trolley wire. This constitutes the main feature of my invention as hereinafter more fully explained, and as summarized in the claims.

Figure 1:
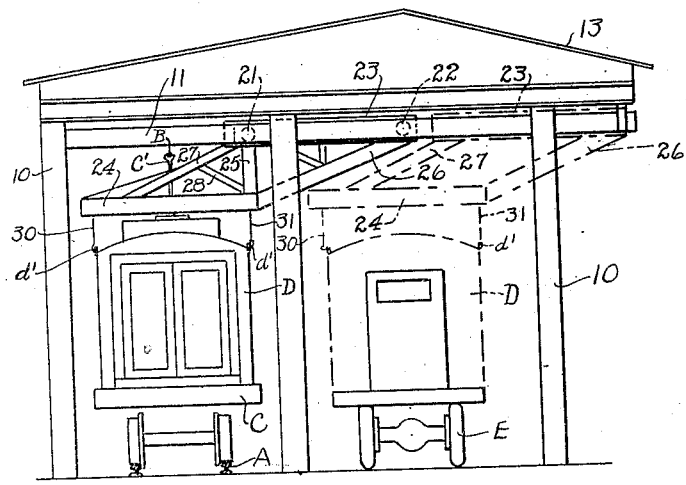
Figure 2:
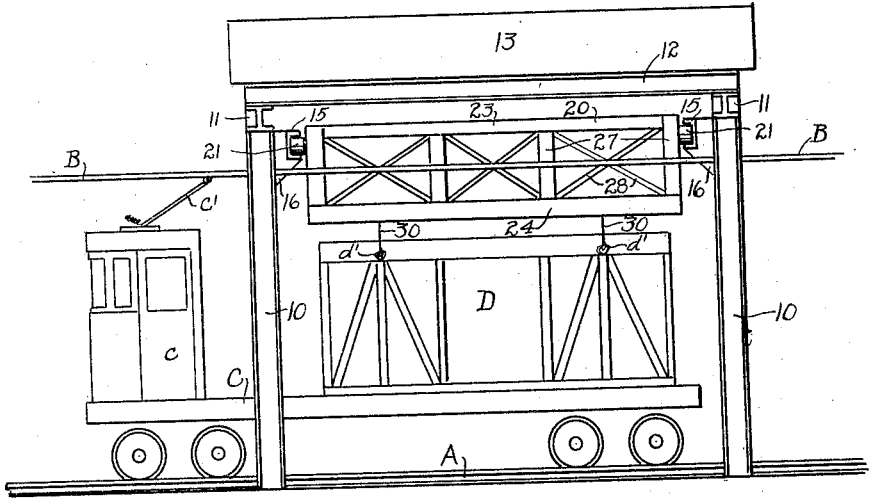
Figure 3:
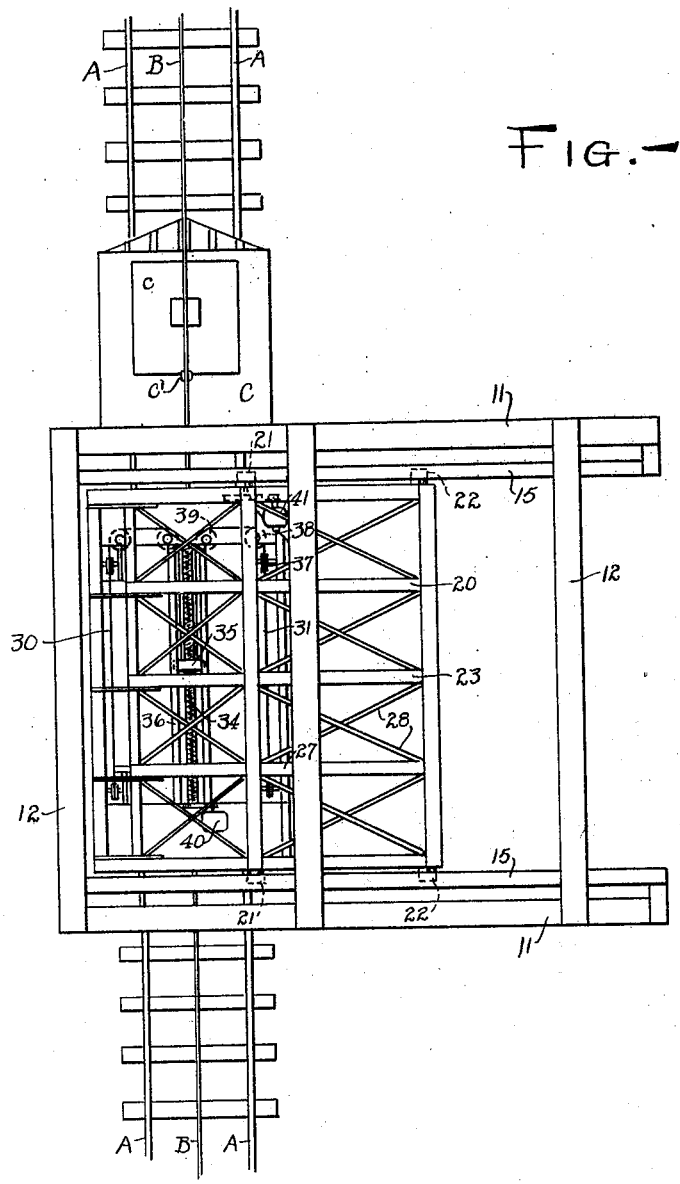

In the drawings, Fig. 1 is an elevation, transversely of an electric railway track, of the superstructure and my traveling crane; Fig. 2 is an elevation at right angles to Fig. 1; Fig. 3 is a plan of the installation, the roof being omitted.

As shown in the drawings, A represents an electric railway track, B the usual suspended trolley wire therefor, and C an elelctric flat car adapted to travel on such rails by electric power. This flat car may have a cab $c$ and a trolley pole $c'$. D indicates the removable body, which may be mounted on the flat car in the rear of the cab. This body is preferably of such size that it may also readily fit on an automobile truck (as indicated at E in Fig. 1) so that the body may be interchanged as desired between the truck and flat car. The body may be provided with suitable doors $d$, and at the eaves with hooks or eyes $d'$ or other means for attachment of raising cables.

As shown in the drawings, the superstructure is located at one side of the truck and extends over the track. As shown, such superstructure has upright posts 10, suitable cross beams 11 and tie members 12, and may also be provided with a roof 13. The superstructure also carries a pair of crane trackways extending from one side to the other. These trackways are shown as inwardly facing channel beams 15 carried by brackets 16 secured to posts 10.

The tracks 15 support my traveling crane 20 which has forward wheels 21 and rear wheels 22, all occupying the grooves of the channels. The entire crane frame is a rigid unitary structure, shown as comprising an upper frame 23, a lower frame 24, laterally offset from the upper frame, and suitable vertical struts 25, inclined struts 26 and 27, and diagonal transverse bracing 28. By reason of this lateral offset arrangement, the lower frame 24 may be projected into the space between the body D and the trolley wire B, and thus carry the raising cables 30 and 31 into position to engage the body.

One end of the lower frame 24 preferably extends beneath the opposite end of the upper frame 23, and the raising cables 31 for one side of the car preferably depending from the lower frame from a region directly beneath a pair of supporting wheels 21 carried by the upper frame. Thus one-half of the load is supported directly by a downward pull on this pair of supporting wheels. The other pair of raising cables 30 are supported adjacent the free end of the lower frame 24. The downward stress of these cables is transmitted into an upward stress on the opposite end of the upper frame, the whole structure tending to pivot about the wheels 21; thus the wheels 22, when the load is supported by the cables, bear upwardly against an upper track. By providing upper and lower tracks for these wheels 22, stress is taken whether it be downward or upward. In the interest of simplicity, I provide the same tracks for both sets of wheels, these tracks being shown as simply the flanges of the two channel beams 15.

On the hoist frame is a suitable raising mechanism operating the four cables as a unit. There is also mechanism for rotating one or more of the supporting wheels, to trolley the frame. When the crane stands entirely at the side of the railway track, as shown in broken lines in Fig. 1, the trolley car operates through the superstructure without regard to the crane. Whenever it is desired however to remove a body from a freight car or place a body thereon, the crane is simply trolleyed laterally to come beneath the trolley wire without touching it, and it may then raise or lower the body with reference to the car.

While any suitable mechanism may be employed on the crane for raising the cables as a unit, I have illustrated a rotatable screw and traveling nut for this purpose. This is shown in Fig. 3. In this figure 34 indicates the screw, 35 the nut, and 36 guide bars for the nut. The cables 30 and 31 pass upwardly from their free ends over sheaves 37 carried by the lower frame of the hoist, and thence around horizontal sheaves 38 and 39, and are finally anchored to the nut.

Accordingly, the rotation of the screw operates to raise or lower simultaneously all four of the load engaging cables, which may be hooked to the hooks or eyes of the body. The screw may be rotated by any suitable means, as for instance an electric motor 40. The crane preferably has also a motor 41 geared with one of the supporting wheels 21, whereby the crane may be shifted along its track. Both motors preferably receive their current from the trolley circuit.

In ordinary operation of the construction described, the hoist frame 20 is located in the side positions as shown in dotted lines in Fig. 1, and the electric car operates in a normal manner without regard to the transfer apparatus. Now, when it is desired to use the transfer mechanism, to carry a loaded body from a truck for example to an empty flat car, the hoist may pick up the load from the truck and support it until the flat car arrives while the truck may drive away for other duty. After the car has arrived the hoist is simply trolleyed to the other position overhanging the car (as shown in full lines in Fig. 1) and the body deposited on the car, after which the hoist resumes its other position, and the car may proceed on its route. Or if a trolley car with a loaded body is brought into position beneath the crane trackway, the crane is then brought to that position and the cables lowered and connected to the body, and the body may then be raised by the electric motor 40, and thereafter transported laterally by the motor 41. The body is thus brought to the side of the railroad track, where it may for instance be deposited on suitable supports or "horses" or on the automobile truck E indicated in Fig. 1. The apparatus is simple in construction and its operations may be quickly performed.

I claim:—

1. The combination with a railway track and a trolley wire above it, of upper and lower parallel crane tracks transversely of the railway track in planes higher than the trolley wire, a truck runway beneath the crane tracks and alongside of the railway track, a traveling crane on said trackways having two sets of supporting wheels and having a downwardly and laterally extended rigid portion forming a fixed part of the crane frame and adapted to be projected beneath the trolley wire, flexible raising means on the downwardly and laterally extended portion adapted to engage a removable body on a car on the railway track whereby said body may be lifted from the car and suspended from the laterally extended portion of the crane frame, one set of wheels carried by the crane frame forming a pivot, and the other set bearing against the upper crane tracks which take the upward thrust caused by downward stress on the overhanging portion of the frame, and means for transporting the crane with the body laterally.

2. In an apparatus of the class described, the combination of a supporting structure, a crane trackway thereon, a crane having an upper frame, a lower frame laterally offset from the upper frame and rigid connections between said frames to make them a unit, four sheaves carried by the lower frame at the four corners of a rectangle, four raising cables depending from the lower frame over said sheaves, mechanism mounted on the upper frame for drawing said cables upwardly as a unit and supporting the same, wheels carried by the upper frame adapted to support the same, and a trackway carried by the superstructure for taking the upward thrust caused by downward stress on the overhanging portion of the lower frame.

In testimony whereof, I hereunto affix my signature.

BENJAMIN F. FITCH.